(12) United States Patent
Caine et al.

(10) Patent No.: US 7,246,609 B2
(45) Date of Patent: Jul. 24, 2007

(54) INTERNAL COMBUSTION ENGINE HAVING CYLINDER DISABLEMENT

(75) Inventors: Jon Caine, South Woodham Ferrers (GB); Patrick Phlips, Cologne (DE); Marcus Davies, Rochester (GB)

(73) Assignee: Ford Global Technologies, LLC, Dearborn, MI (US)

( * ) Notice: Subject to any disclaimer, the term of this patent is extended or adjusted under 35 U.S.C. 154(b) by 29 days.

(21) Appl. No.: 11/364,973

(22) Filed: Mar. 1, 2006

(65) Prior Publication Data

US 2006/0196178 A1    Sep. 7, 2006

(30) Foreign Application Priority Data

Mar. 1, 2005    (GB) ................................. 0504168.6

(51) Int. Cl.
*F02M 23/07*    (2006.01)
*F02B 47/08*    (2006.01)
*F02D 13/06*    (2006.01)
*F01N 7/00*    (2006.01)

(52) U.S. Cl. .............................. 123/568.11; 123/198 F; 60/324

(58) Field of Classification Search ............ 123/198 F, 123/323, 481, 568.11, 568.21; 60/284, 285, 60/299, 324; 701/104, 108
See application file for complete search history.

(56) References Cited

U.S. PATENT DOCUMENTS

| 4,143,635 | A | * | 3/1979 | Iizuka et al. ................. 123/481 |
| 4,336,775 | A | | 6/1982 | Meyer |
| 4,337,740 | A | | 7/1982 | Sugasawa et al. |
| 4,344,393 | A | * | 8/1982 | Etoh et al. ................ 123/198 F |
| 4,391,240 | A | * | 7/1983 | Sugasawa et al. ........ 123/198 F |
| 4,411,228 | A | * | 10/1983 | Sugasawa ................ 123/198 F |
| 4,462,351 | A | * | 7/1984 | Fujii et al. ................ 123/198 F |
| 4,467,602 | A | * | 8/1984 | Iizuka et al. ................... 60/276 |
| 4,615,307 | A | | 10/1986 | Kodama et al. |
| 6,109,027 | A | * | 8/2000 | Schaefer ....................... 60/324 |
| 6,179,096 | B1 | * | 1/2001 | Kinerson et al. ............ 188/154 |
| 6,598,619 | B2 | * | 7/2003 | Gagnon ....................... 123/323 |
| 7,213,566 | B1 | * | 5/2007 | Jankovic et al. ............ 123/302 |
| 2005/0268880 | A1 | * | 12/2005 | Bidner et al. ............ 123/198 F |

FOREIGN PATENT DOCUMENTS

| DE | 19716042 | 5/1998 |
| GB | 2289501 | 11/1995 |
| GB | 2342893 | 4/2000 |
| JP | 2000-179329 | 6/2000 |

* cited by examiner

*Primary Examiner*—Willis R. Wolfe, Jr.
(74) *Attorney, Agent, or Firm*—Julia Voutyras; Allan J. Lippa

(57) ABSTRACT

A multi-cylinder internal combustion engine having an exhaust system with an exhaust emission after-treatment device for exhaust gases from the cylinders, an air supply system for supplying fresh air to the cylinders, a fuel supply system for supplying fuel to each cylinder, and a controller to cut off the fuel supply and disable at least one cylinder, and preferably two cylinders in opposing pairs. A valve assembly is located between the cylinders to be disabled and the emission after-treatment device and is operable to divert gases from said the disabled cylinders via a recirculation conduit back to the air supply system.

9 Claims, 3 Drawing Sheets

*1 Torque Match during mode switch is required, based on throttle and ignition control
*2 Delay to purge exhaust gas from manifold runners without saturating catalyst with oxygen, this prevents excessive EGR returning to intake manifold and causing engine instability
*3 Period of rich bias to remove the excess oxygen from the catalyst.

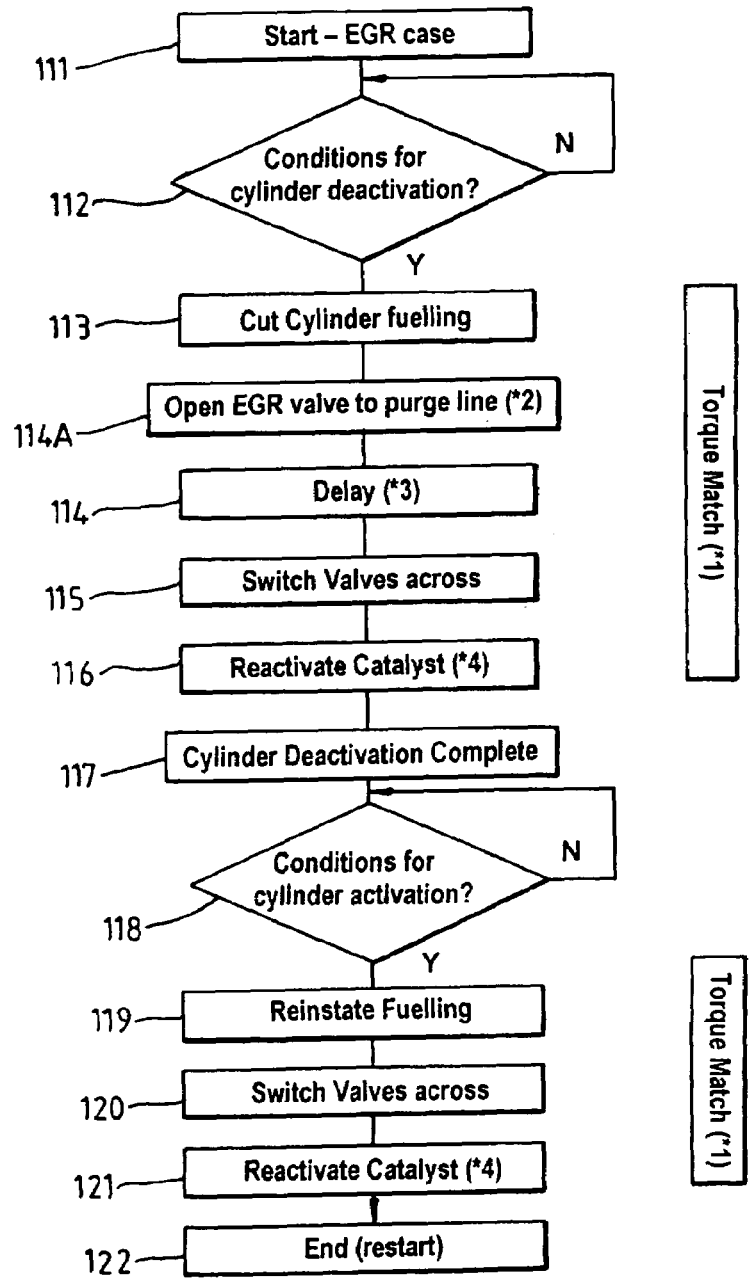

*1 Torque Match during mode switch is required, based on throttle and ignition control
*2 EGR valve opens to purge the EGR gas from the line and prevent excessive EGR
*3 Delay to purge exhaust gas from manifold runners without saturating catalyst with oxygen, this prevents excessive EGR returning to intake manifold and causing engine instability
*4 Period of rich bias to remove the excess oxygen from the catalyst.

*Fig. 3*

INTERNAL COMBUSTION ENGINE HAVING CYLINDER DISABLEMENT

FIELD OF INVENTION

This invention relates to an internal combustion engine with cylinder disablement, and more particularly to controlling engine exhaust flow into an exhaust emission after-treatment device following cylinder disablement.

BACKGROUND AND SUMMARY OF THE INVENTION

Cylinder disablement is a method of isolating selected cylinders of a multi-cylinder engine in order to reduce fuel consumption. This may be done by disabling the cylinder valves, typically by electro-hydraulic control as is shown in DE 197 16 042 C, or mechanical disablement as is shown in U.S. Pat. No. 4,336,775 or U.S. Pat. No. 4,615,307. Also a variable timing/lift may be adapted and modified to completely eliminate the lift of one exhaust valve for each cylinder. GB 2 342 893 discloses a method of controlling exhaust valves so that the valves remain closed following cold starting of the engine.

Another method of cylinder disablement is to cut off the supply of fuel to selected cylinders, particularly to save fuel under conditions of light load. This increases the load on the other cylinders and reduces pumping losses.

The inventors herein have recognized a problem with this procedure, namely that the disabled cylinders will pump fresh air into the exhaust system. This will prevent a standard three way catalyst in an exhaust emission after-treatment device from functioning correctly in the conversion of all pollutants to less harmful products. It also causes a significant gas flow through the intake and exhaust systems causing some pumping losses.

According to the present invention, a system that overcomes the above disadvantages includes: a multi-cylinder internal combustion engine; an air supply system for supplying fresh air to said engine cylinders; a fuel supply system for supplying fuel to said engine cylinders; an emission after-treatment device coupled downstream of said engine; a valve assembly coupled between said engine and said emission after-treatment device, said assembly including a first valve and a second valve; and a controller disabling fuel supply to at least one of said engine cylinders, said controller adjusting said first valve to divert exhaust gases from said disabled cylinders back to said air supply system; and adjusting said second valve to control the flow of engine exhaust gases to said emission after-treatment device.

Each assembly is associated with a plurality of cylinders to be disabled. Preferably the cylinders are disabled in opposing pairs, for example in a four cylinder in line engine the cylinders 2 & 3 will be disabled. This has the advantage that gas flows from the two cylinders may be readily combined for recirculation to the air supply system.

The second valve may also be used as an EGR (exhaust gas recirculation) valve.

The valves are preferably butterfly valves which are formed from a suitable high temperature resistant material, that is, temperatures in excess of 950° C. The valves may be located in the exhaust manifold passageways of the cylinders to be disabled and preferably where two adjacent cylinders are disabled the two manifold passageways may be interconnected for connection to a single recirculation conduit.

The valves may be independently operated by a respective actuator, the two actuators being controlled by the control means which in turn may be part of the ECU (Engine Control Unit). The butterfly valves are preferably rotationally off-set by 90 degrees of arc. This prevents simultaneous closure of the exhaust and recirculation passageways. In an alternative arrangement, the two valves may be linked for operation by a single actuator. Preferably, the two valves are mounted on a common spindle operated by the single actuator.

The invention is applicable any engine configuration, for example, 4, 6, 8, or 12 cylinders arranged in-line or in a V 8 configuration, and to engines having catalyst after-treatment devices which are arranged in either banks or cascades. The invention is particularly suitable for V configuration engines where the fuel to a complete bank of cylinders can be diverted to the other bank of cylinders thus disabling a complete bank of cylinders.

For V configuration engines, where at least one cylinder of each bank of cylinders may be selectively disabled, a respective valve assembly may be provided for each or the cylinder to be disabled, and more preferably, a respective valve assembly is provided only for each bank containing a cylinder to be disabled.

The above advantages, and other advantages and features of the present invention will be readily apparent from the following detailed description of the preferred embodiments when taken in connection with the accompanying drawings, and from the claims.

BRIEF DESCRIPTION OF DRAWINGS

The advantages described herein will be more fully understood by reading an example of an embodiment in which the invention is used to advantage, referred to herein as the Description of Preferred Embodiment, with reference to the drawings, wherein:

FIG. 3 is an alternative logic flow diagram for a modified control of cylinder disabling.

DETAILED DESCRIPTION OF PREFERRED EMBODIMENT(S) OF THE INVENTION

Figure 1:
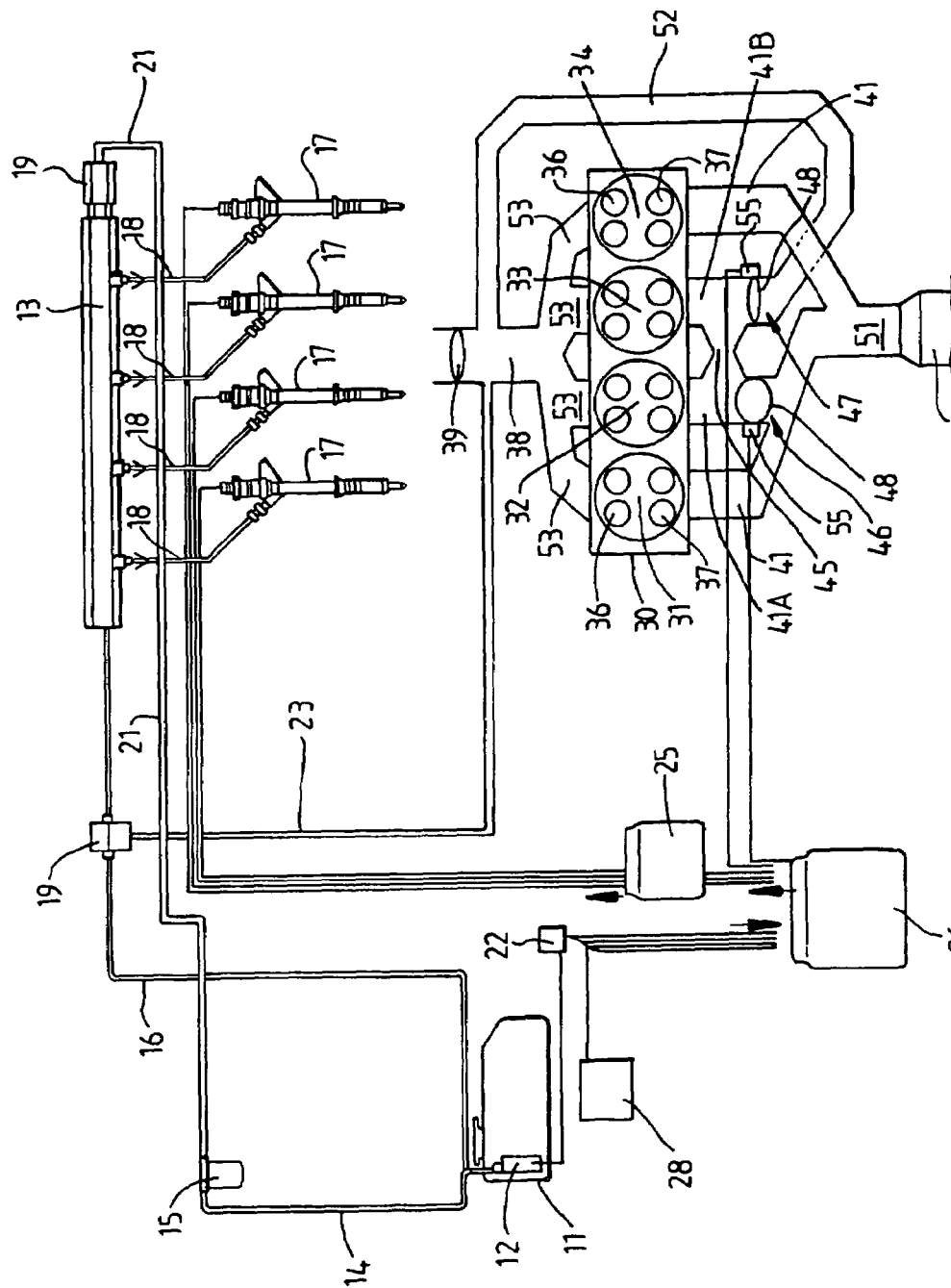
FIG. 1 is a schematic drawing showing an internal combustion engine cylinder according to the present invention.

With reference to FIG. 1, there is shown a schematic diagram of an internal combustion engine 30 of a vehicle. The invention is applicable to both diesel engines and petrol engines. The engine shown in FIG. 1 of the present example is a petrol engine. The internal combustion engine 30 has a plurality of cylinders 31 to 34, in this example four cylinders but there may be any desired number of cylinders arranged in any desired configuration e.g. in-line, V configuration, and horizontally opposed cylinders.

The engine fuel system includes a storage tank 11, and an inboard fuel pump 12 which delivers fuel from the tank 11 via a conduit 14 to a filter 15. The filter 15 is connected to a common supply rail 13 via supply conduit 21. The common rail 13 feeds fuel via respective fuel pipes 18 to a plurality of fuel injectors 17, one per cylinder, and in this example, four injectors 17. The common rail 13 is also connected via a conduit 16 a pressure regulator valve 19 which in turn is connected to conduit 23 to vent fuel vapour to the air supply system 38 when the pressure in the rail 13 exceeds a predetermined maximum pressure. The fuel pump 12 is operated through a relay 22 connected to the ECU 26.

The fuel supply to the combustion chamber of each cylinder is controlled by an electronic drive unit (EDU) 25, or controller, which operates the injectors 17 and which is in turn connected to the engine controller 26. In an alternative arrangement, the EDU 25 may be arranged as part of the ECU 26.

The ECU 26 is programmable and is connected to the fuel pump 12 and to a plurality of other engine condition sensors shown schematically as sensor 28. The engine condition sensors 28 may include, but are not limited to, sensors which monitor engine position, engine speed, manifold static pressure, mass air flow into the manifold, engine temperature, air temperature, cam shaft position (inlet and exhaust), inlet manifold tuning valves, barometric pressure, EGR amount, VCT position, torque demand, gear position etc.

Each cylinder 31-34 has a piston (not shown) reciprocable within the bore of the cylinder and at least one inlet valve 36 and a least one exhaust valve 37. The inlet valves 36 are each connected to an air supply system 38 having a throttle valve 39, via an inlet port 53. The exhaust valves 37 are each connected via a respective manifold branch 41 to an exhaust emission after-treatment device 42, for example, a catalytic converter.

The fuel injectors 17 may inject the fuel supply directly into each respective cylinder or may supply fuel to the inlet valve ports 53, the injection timing being controlled the controller. The engine 30 has cylinder disablement operable for two cylinders 32 and 33 which are the oppositely matched $2^{nd}$ and $3^{rd}$ cylinders. During cylinder disablement the supply of fuel to the cylinders 32, 33 is cut off by individually disabling the respective fuel injectors 17 with the disablement being controlled by the programmable ECU which disables the fuel injection to a disabled cylinder while the other cylinders fire normally.

The manifold branches 41 all merge into a single exhaust conduit 51, which conducts exhaust gases to a catalytic converter 42. The exhaust manifold branches 41A and 41B of the $2^{nd}$ and $3^{rd}$ cylinders 32, 33 are adjacent each other and are interconnected via a passageway 45. The outlets from the manifold branches 41A, 41B to the exhaust conduit 51 are opened/closed by means of a butterfly valve 46. The manifold 41B for the $3^{rd}$ cylinder is connected via a recirculation conduit 52 to the air supply system 38. The connection between the manifold 41B, and also the interconnected manifold 41A, and the air supply system 38 is opened/closed via of a butterfly valve 47. The valves 46, 47 are made from a suitable high temperature resistant material typically a corrosion resistant metallic compound of the type conventionally used for exhaust gas recirculation valves.

The two valves 46, 47 are rotationally off-set by 90° and one valve may be fully open as shown for valve 46 when the other valve is fully closed as shown for valve 47. The valves each are each mounted on a respective spindle 48. In an alternative arrangement a single spindle 48 may be common to both valves. The two valves 46 47 are each operated by a respective actuator 55. When the two valves 46, 47 are mounted on a single spindle (not shown), the valves may be operated by a single actuator. The two actuators 55 are independently controlled by the ECU 26. The two valves being off-set by 90° ensures that the two cylinders 32, 33 are always open to one of the recirculation conduit 52 and the exhaust conduit 51.

The operation of the engine 30 is controlled by the controller 26 in response to vehicle operating conditions sensed by the sensors represented by sensor 28. The ECU 26 is connected to the fuel injectors 17, either indirectly as shown through EDU 25, or directly, to control the operation thereof. The ECU 26 can determine the injection timing and the injection period or pulse width. The ECU also controls the valves 46, 47 in the exhaust system.

Under normal engine operating conditions, the valve 46 is open and the valve 47 closed and exhaust gases pass through to the after-treatment device 42 in the normal manner.

Under cylinder deactivation conditions, the respective valve 46 is switched by the actuator 53 to a closed condition, in which case the valve 47 is in an open condition. Gases from the cylinders 32, 33 are pumped through the conduit 52 back to air supply system 38. This maintains the gas flow over the catalyst at high temperature and at a stoichiometric mixture due to the catalyst receiving only gas flow from the cylinders 31 and 34. The pumping loop for a fresh air change is made very short.

In an alternative method, the valves 46/47 can also be utilised for exhaust gas recirculation control.

Figure 2:
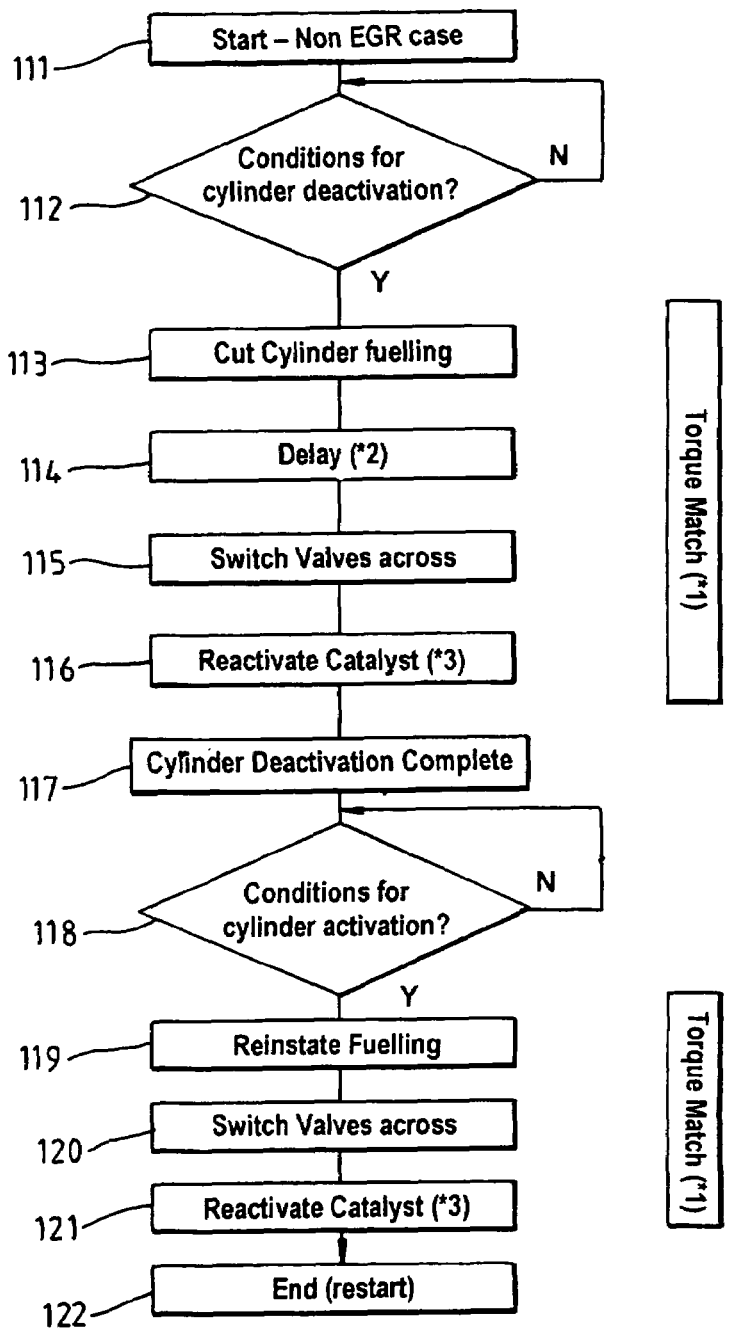
FIG. 2 is a logic flow diagram for the control of cylinder disabling.

The logic steps in the ECU 26 are shown in FIG. 2 where no exhaust gas is recirculated.

The process begins at Step 111.

Step 112 determines if disablement should occur. If no, the step is repeated. If yes, the system proceeds to step 113.

Step 113 cuts the fuel supply to the disabled cylinders.

Step 114 provides for a short delay to purge exhaust gas from the manifold without saturating the catalyst in oxygen, and prevents excessive exhaust gas recirculation back through the air supply system, thereby preventing engine instability.

After the delay, step 115 switched the valve 46 to close the manifold and open the recirculation conduit. The ECU must determine that there is a torque match during the mode switch based on throttle and ignition controls.

Step 116 provides for fuel-rich pulses to remove excess oxygen from the catalyst.

At Step 117, the deactivation is completed.

Step 118 determines if the conditions are right for cylinder re-activation. If no, the step is repeated. If yes, then the control proceeds to step 119.

Step 119 reinstates the fuel supply to the deactivated cylinders.

Step 120 switches the valve 46 to open to pass and the valve 47 to a closed condition. Again, there must be a torque match during the mode switch.

Step 121 reactivates the catalyst, and at step 122 the system is ready to restart.

Now, with reference to FIG. 3, there are shown the control steps including exhaust gas recirculation. In this case, a separate exhaust gas recirculation valve is opened at step 114A, immediately after the cylinder fuel cut off, to purge exhaust gases from the recirculation system before switching the valve 47 to closed.

This concludes the description of the invention. The reading of it by those skilled in the art would bring to mind many alterations and modifications without departing from the spirit and the scope of the invention. Accordingly, it is intended that the scope of the invention be defined by the following claims.

The invention claimed is:

1. An automotive system, comprising:
   a multi-cylinder internal combustion engine;
   an air supply system for supplying fresh air to said engine cylinders;

a fuel supply system for supplying fuel to said engine cylinders;

an emission after-treatment device coupled downstream of said engine;

an assembly coupled between said engine and said emission after-treatment device, said assembly including a first valve and a second valve; and a controller disabling fuel supply to at least one of said engine cylinders, said controller adjusting said first valve to divert exhaust gases from said disabled cylinders back to said air supply system; and adjusting said second valve to control the flow of engine exhaust gases to said emission after-treatment device.

2. The system as claimed in claim 1, wherein said first valve second valve also functions as an EGR valve.

3. The system as claimed in claim 1, wherein said valves are located in the exhaust manifold passageways of the cylinders to be disabled.

4. The system as claimed in claim 1, wherein the engine is an in-line engine having two cylinders to be disabled and said two cylinders are adjacent and the exhaust manifold branches therefrom are interconnected for connection to the air supply system via a single recirculation conduit.

5. The system as claimed in claim 1, wherein each said valve is butterfly valve.

6. The system as claimed in claim 5, wherein said two butterfly valves are rotationally off-set by about 90 degrees of arc.

7. The system as claimed in claim 1, wherein the engine is a V configuration engine having two banks of cylinders with at least one cylinder in each bank to be disabled, each bank of cylinders being provided with at least one said assembly.

8. The system as claimed in claim 7, wherein said valves are operated by at least one actuator controlled by said controller.

9. The system as claimed in claim 8, wherein said two valves are mounted on a common spindle operated by a single actuator.

* * * * *